Dec. 29, 1936.  G. PIELSTICK  2,066,223
COUPLING
Filed Feb. 21, 1934  2 Sheets-Sheet 1

Inventor
Gustav Pielstick
by Maréchal + Noe
attys.

Dec. 29, 1936.  G. PIELSTICK  2,066,223
COUPLING
Filed Feb. 21, 1934  2 Sheets-Sheet 2

Inventor
Gustav Pielstick
by Maréchal & Noe
attys.

Patented Dec. 29, 1936

2,066,223

UNITED STATES PATENT OFFICE 2,066,223

COUPLING

Gustav Pielstick, Augsburg, Germany, assignor to Maschinenfabrik Augsburg-Nürnberg A. G., Augsburg, Germany, a corporation of Germany Application February 21, 1934, Serial No. 712,335
In Germany February 27, 1933

10 Claims. (Cl. 64—27)

This invention relates to couplings, and more particularly to a coupling device adapted to yieldingly interconnect driving and driven shafts or other elements.

One object of the invention is the provision of a coupling member embodying coaxial driving and driven elements adapted for slight relative rotational movement and interconnecting in a yielding or resilient manner, and of especially simple, compact and cheap construction.

Another object of the invention is the provision of a coupling member embodying coaxial driving and driven elements adapted for slight relative rotational movement one within the other and interconnected by a series of yielding connecting members through which the torque is transmitted.

Another object of the invention is the provision of a shaft coupling having telescoped driving and driven elements which are yieldingly interconnected by a series of springs arranged in bores in the telescoping portions of the driving and driven elements.

Other objects and advantages of the invention will be apparent from the following description, the appended claims and the accompanying drawings, in which,—

Figure 1:
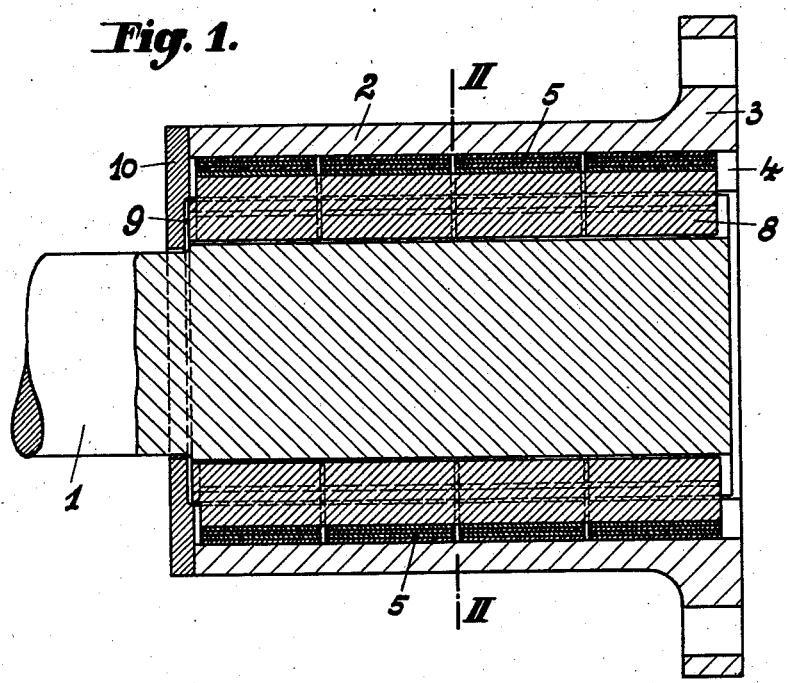
Fig. 1 is a central longitudinal section of a coupling embodying the present invention.
Figure 2:
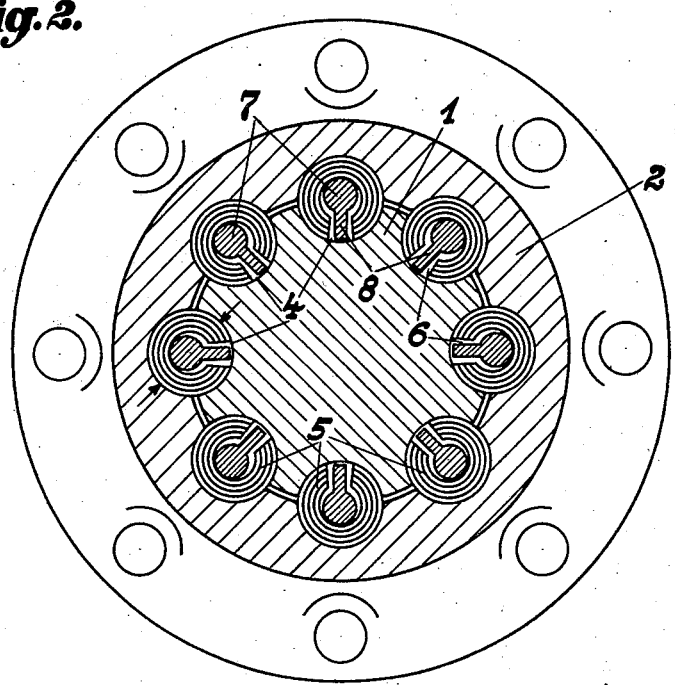
Fig. 2 is a transverse section taken on the line 2—2 of Fig. 1.

Cross-reference is made to my application for Spring element, filed on even date herewith, now Patent No. 2,039,342.

Referring more particularly to the drawings by reference numerals, 1 designates the end of a drive shaft such as the crank shaft or power transmission shaft of an internal combustion engine, although this shaft may be any shaft adapted for force transmission. The end of the shaft 1 is in telescoped relationship with the driven element 2 which, in the form shown, is a hollow member having a flange 3 by means of which it may be connected to a correspondingly flanged portion of a driven device. A suitable clearance is provided between the cylindrically formed outer surface on the end of the shaft 1 and the telescopically related surface of the driven element 2. While the element 1 will be herein referred to as the driving element it will be understood that the element 2 may be the driving element and the part 1 the driven element of the coupling.

Both the driving and the driven elements, at their telescopically related portions, are provided with a series of complementary semi-cylindrical grooves constituting bores 4 the axes of which are located in the cylindrical surface defined by the telescoping portion of the shaft 1. The longitudinal axis of the bores are preferably parallel to the axis of the shaft 1. In each of the bores 4 is a yielding connecting member 5 by means of which torque is yieldingly transmitted from the driving shaft to the driven shaft. As herein shown the yielding members are formed as metallic springs. The spring members 5 preferably embody a series of nested spring parts each in the form of a longitudinally extending tube or shell open along one side so as to be substantially C-shaped in cross-section. The several spring parts constituting each spring member fit or nest one within the other, the outer spring part being so curved as to fit properly within the longitudinal bore 4. The spring parts are so arranged in the receiving bore 4 that their open sides 6 are directed radially of the coupling and preferably toward the shaft center so that the sides of the spring parts simultaneously engage the outer portions of the shaft 1 and the inner portion of the element 2. The springs when unconfined are somewhat larger in cross-sectional form than the diameters of the bores 4, so that when the springs are within the bores, and under normal conditions, the sides of the springs press outwardly and are initially stressed so as to exert some desired expansive force tending to maintain the relative positions of the driving and driven elements. However, when a substantial force or torque is transmitted from the driving element to the driven element, forces will be exerted in the direction of the arrows tending to compress or deflect the springs, which serve to yieldingly transmit the torque and smooth out irregularities or peaks in the torque forces. Inasmuch as a large portion of the outer spring part is engaged with the bore 4 and there is substantially full surface engagement between adjacent spring parts, excessively rapid relative movement between the driving and driven elements will be damped out.

Located within each spring member is a metal core 7 embodying a substantially cylindrical portion and a projecting rib 8. The outside diameter of the cylindrically formed central portion of the core is smaller than the normal inside diameter of the inner shell of the spring, this portion of the core forming a curved abutment around which the spring wraps or deflects during the transmission of torque, the construction being such that the greater the spring deflects the greater will be the resistance to deflection as the point of engagement between the spring and the core approaches the point of force application. The abutment thus serves to control and limit the spring flexure to a safe value below the elastic limit.

The rib 8 is provided between the opposed edges or ends of the spring parts, as shown, and extends the full length of the springs, and thus maintains the individual shell spring parts properly located with respect to each other and with respect to the shaft center, inasmuch as the rib 8 is positioned against turning movement in the driving or driven element. Each rib 8 projects at its end into a groove 9 provided in the cover plate 10 which is secured by bolts or other suitable fastening means to the ends of the driven element 2. The rib 8 is thus held so as to project radially and hold the open sides 6 of the spring shells directed toward the central axis of the coupling, maintaining the springs in the desired positions for adequately assuming and transmitting the torque in a yielding manner.

While the length of a spring part may correspond to the total length of the bores 4, where the bore is of considerable length a number of springs are arranged end to end around a common core as shown in Fig. 1.

It will now be apparent that the coupling is quite small and compact, and of simple and cheap construction. The strength of the spring members which yieldingly interconnect the driving and driven elements of the coupling may be made of any desired value inasmuch as the number of springs in any of the yielding connecting members can be readily changed, and the number of yielding members in the series can also be readily varied in any coupling.

Couplings which cannot be extended axially because of lack of space can be made of large diameter and short length. In a large diameter coupling it is possible to provide a considerably larger number of concentrically arranged longitudinal bores so that sufficient elasticity is obtained even though only one shell spring is located in each longitudinal bore. A change in the degree of elasticity can be accomplished in such case by utilizing a shell spring only in some of the bores, or by changing the number of shell spring parts of the individual spring members.

Figure 3:
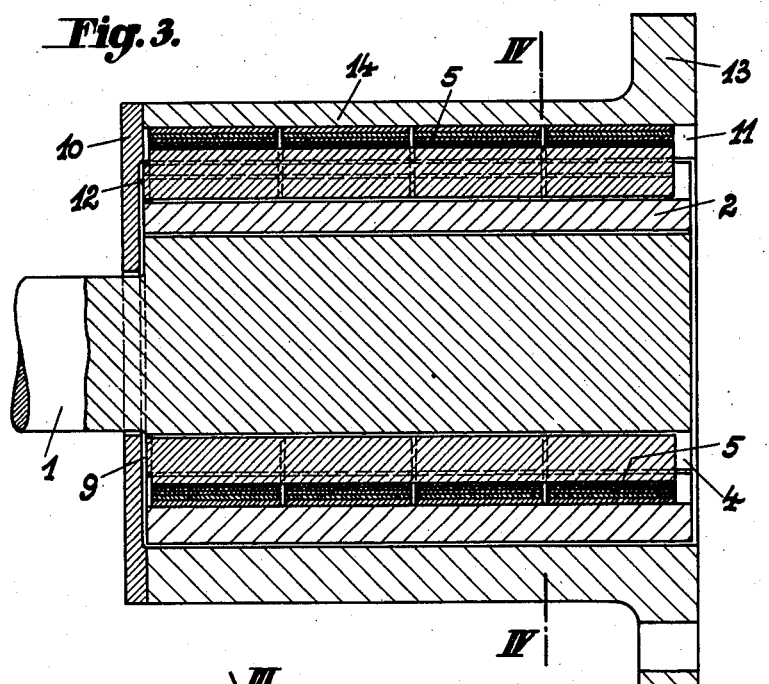
Fig. 3 is a longitudinal section on the line 3—3 of Fig. 4, of a coupling having an intermediate member yieldingly connected to both the driving and driven elements.
Figure 4:
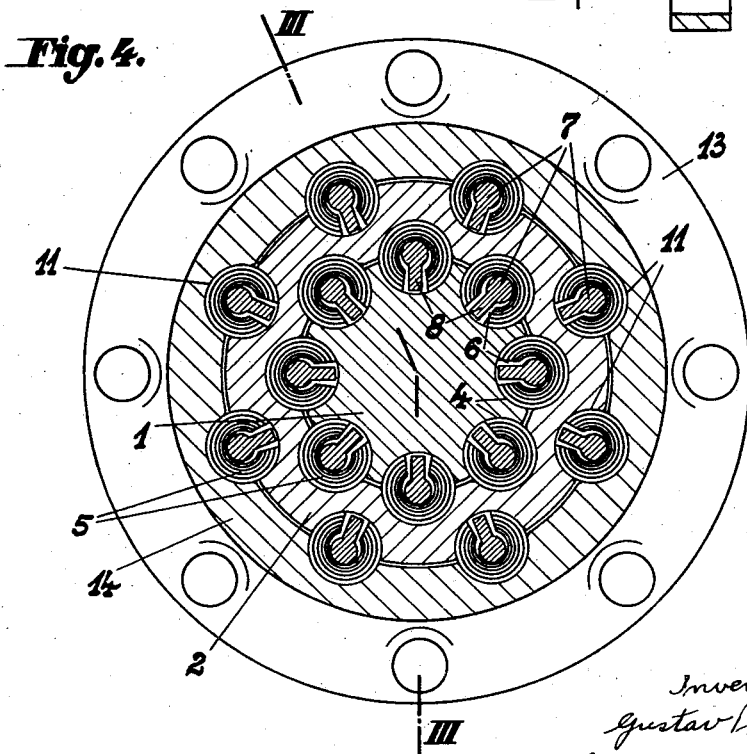
Fig. 4 is a transverse section on the line 4—4 of Fig. 3.

The elasticity of the coupling may be made quite large by utilizing one or more intermediate elements between the driving and driven elements, the several elements being yieldingly connected together in accordance with this invention. As shown in Figs. 3 and 4, the end of the drive shaft is in telescopic relationship with an intermediate element 2, there being a series of longitudinal bores 4 provided partly in the telescoping portions of the driving element 1 and intermediate element 2. In the bores 4 are a series of the spring members 5. The outside of the intermediate element 2 is in telescopic relationship with an outer driven element 14 which is flanged as shown at 13 so as to be suitably connected to a device to be driven. Between the intermediate and driven elements 2 and 14 is a second series of spring connecting members. The various connecting members 5 between the intermediate and driving element and between the intermediate and driven element, as shown, are each provided with a core 7 having a rib 8 which is extended at one end so as to fit into radial slots or grooves 9 and 12 in the cover plate 10. The cores are thus prevented from rotating about their own axes and held so that the ribs project radially, thus maintaining the sides of the springs in their proper position for assuming the thrust forces applied in the direction of the arrows shown in the drawing.

The coupling is preferably sealed oil tight at both ends, suitable packing material (not shown) being employed between the inside surface of the plate 10 and the shaft 1, while the opposite end of the coupling is sealed by the member which is connected to the flange on the driven element. Thus the shell springs may be permanently submerged in oil and the wear of the spring parts is reduced to a minimum.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A coupling comprising coaxial driving and driven elements having portions adapted for slight relative rotational movement, said portions having a series of bores each partly in the driving element and partly in the driven element and arranged parallel to the axis of said elements, a substantially C-shaped spring in each of said bores for yieldingly connecting the driving and driven elements, a rigid core at the bight portion of the spring around which the spring is curved for the control of the spring flexure, means on said core for contacting the ends of the spring, and cooperating means on said core and one of said elements for holding the core in predetermined position.

2. A coupling comprising coaxial driving and driven elements having portions adapted for slight relative rotational movement, said portions having a series of bores each partly in the driving element and partly in the driven element and arranged parallel to the axes of said elements, a substantially C-shaped spring in each of said bores frictionally engaged therewith throughout the length of the spring for yieldingly connecting the driving and driven elements, and a rigid core around which the middle of each spring is curved and adapted to limit spring flexure.

3. A coupling comprising coaxial driving and driven elements having portions adapted for slight relative rotational movement, said portions having a series of bores each partly in the driving element and partly in the driven element and arranged parallel to the axes of said elements, a substantially C-shaped spring in each of said bores for yieldingly connecting the driving and driven elements, a rigid core around which each spring is curved, each core having a rib adjacent the ends of the spring, and means positioning the ribs in one of said elements so as to extend substantially radially.

4. A coupling comprising coaxial driving and driven elements having telescoped portions adapted for slight relative rotational movement, said telescoped portions having a series of chambers each partly in the driving element and partly in the driven element, a plurality of nested substantially C-shaped spring parts in each of said chambers for yieldingly connecting the driving and driven elements, a rigid core in each chamber around which said spring parts are curved, each core having a rib between the ends of the spring parts adapted to maintain the spring parts in predetermined position.

5. A coupling comprising coaxial driving and driven elements having telescoped portions adapted for slight relative rotational movement, said telescoped portions having a series of bores each partly in the driving element and partly in the driven element and arranged parallel to the axes of said elements, a spring of substantially cylindrical curvature in each of said bores for yieldingly connecting the driving and driven elements, each spring comprising a number of separate sections arranged end to end longitudinally of a bore, a rigid core in each bore around which the sections of the spring in the bore are curved, each core having a rib adjacent the ends of the spring sections adapted to maintain the spring sections in predetermined positions with respect to planes radial of the coupling, and means positioning the ribs in one of said elements so as to extend substantially radially of the coupling.

6. A coupling having a high degree of damping capacity comprising coaxial driving and driven elements having adjacent portions adapted for slight relative rotational movement, said portions having an annular series of cylindrical chambers each partly in the driving element and partly in the driven element, and a series of nested spring members in each chamber through which motion is transmitted from the driving element to the driven element, the outer member of each series normally assuming a tensioned engagement throughout substantially its entire length with the chamber walls, each of said members being of substantially C-shaped with a cylindrical curvature throughout its length and in frictional engagement with an adjacent spring member but devoid of a rigid connection therewith.

7. A coupling comprising coaxial driving and driven elements having adjacent portions adapted for slight relative rotational movement, said portions having an annular series of cylindrical chambers each partly in the driving element and partly in the driven element, and a series of nested spring members in each chamber through which motion is transmitted from the driving element to the driven element, each of said members being of substantially C-shape with a cylindrical curvature throughout its length and in frictional engagement with an adjacent spring member, and means within each series of spring members exerting a progressively increased resistance to spring flexure as relative movement of said elements from a normal position increases.

8. A coupling comprising coaxial driving and driven elements having telescoped portions adapted for slight relative rotational movement, said telescoped portions having a series of circular bores each partly in the driving element and partly in the driven element and arranged substantially parallel with the axis of said elements, and a spring in each of said portions yieldingly connecting the driving and driven elements, each spring comprising a series of nested spring shells of substantially C-shape with a substantially cylindrical curvature from end to end thereof concentric with its bore, each spring shell being frictionally slidable throughout substantially its entire length on an adjacent spring shell throughout relative rotational movements of said driving and driven element for effectively damping relative turning action of said elements, and means maintaining the open sides of the spring shells in a predetermined range of positioning to face in a direction generally radial of the coupling.

9. A coupling having a high damping capacity for damping oscillatory vibrations comprising coaxial driving and driven elements having telescoped portions adapted for slight relative rotational movement, said telescoped portions having an annular series of long circular bores each partly in the driving element and partly in the driven element and arranged substantially parallel to the axis of said elements, and a plurality of independently acting resilient connecting members arranged end to end axially of each bore, each connecting member comprising a series of nested spring shells each spring shell being of substantially C-shape with a substantially cylindrical curvature throughout its length and free to turn with respect to an adjacent nesting shell and frictionally engaging an adjacent nesting shell throughout substantially its entire extent when the connecting member is expanding and contracting, the outer spring shell of each series normally assuming a tensioned engagement throughout substantially its entire length with the walls of its bore.

10. A coupling comprising driving and driven members having adjacent portions adapted for slight relative movement, said portions having a cylindrical chamber formed partly in the driving element and partly in the driven element, and a series of nested spring shells in said chamber through which motion is transmitted from the driving element to the driven element and having a high degree of damping capacity, each spring shell being of substantially C-shape with a cylindrical curvature and in frictional engagement throughout substantially its entire length with an adjacent spring shell throughout relative movement of the driving and driven members, the outer spring shell of the series normally assuming a tensioned engagement with the walls of said chamber, and means within said spring shells cooperating with the ends thereof to maintain the open sides of the spring shells facing in a direction generally transverse to the direction of movement of the driving and driven members.

GUSTAV PIELSTICK.